March 23, 1965 H. W. STRATFORD 3,174,835
APPARATUS FOR EFFECTING TURBULENT FLOW OF FLUIDS
AND TREATMENT THEREOF IN CONDUITS
Filed April 11, 1960 2 Sheets-Sheet 2

INVENTOR.
HERBERT W. STRATFORD
BY
*Fishburn & Gold*
ATTORNEYS

United States Patent Office 3,174,835
Patented Mar. 23, 1965

3,174,835
APPARATUS FOR EFFECTING TURBULENT FLOW OF FLUIDS AND TREATMENT THEREOF IN CONDUITS
Herbert W. Stratford, Leawood, Kans., assignor to H. W. Stratford Company, Inc., Kansas City, Mo., a corporation of Missouri
Filed Apr. 11, 1960, Ser. No. 21,536
7 Claims. (Cl. 23—285)

This invention relates to methods and apparatus for continuous flow mixing, blending or reacting fluids, liquids, semi-liquids, solids and liquids or semi-liquids and combinations thereof, and more particularly to such methods and apparatus in which mixing, blending or reacting of such fluids and materials is facilitated by turbulent flow of the materials.

This invention contemplates methods and apparatus for mixing, blending or reacting liquid or liquefied materials one with another wherein said liquid materials may be miscible or immiscible, may include combinations of two or more such materials and may contain normally gaseous materials dissolved or otherwise combined therein, as well as finely divided solid material suspended in a liquid medium. The invention also contemplates bringing such materials into intimate contact by mixture for any suitable purpose, including the absorption of or solution of one material in another, the formation of emulsions, the contact of two or more liquid materials for the purpose of chemical reaction therebetween alone or in the presence of catalyst materials, and particularly in a method and apparatus in which the materials are brought together in a combined stream and pass through a plurality of treatment zones in series, said materials moving in a uni-directional flow in a portion of each treatment zone and in counter-current flow in another portion of said zone for turbulent flow through said zones.

The principal objects of the present invention are to provide a method and apparatus for mixing, blending or reacting liquids, semi-liquids, solids and liquids or semi-liquids and combinations thereof in turbulent flow zones arranged in a series along a flow path and cooperative to maintain turbulent flow through a treating area; to provide such apparatus wherein turbulent flow mixing, blending or reacting may be performed under conditions of conduit size, liquid flow quantities and viscosity that give Reynolds numbers substantially below 1200 which is in the range normally considered as providing viscous flow; to provide turbulence-inducing apparatus including a conduit having elongate flow zones in a communicating series wherein flow is uni-directional in one portion and countercurrent in another portion of each flow zone; to provide such an apparatus in a shell having fluid flow around the conduit in heat exchange relation thereto; to provide such a mixing, blending or reacting apparatus with a series of turbulence-inducing zones in a flow path for progressive treatment or mixing and wherein additive or other fluids may be introduced at selected points along said flow path; to provide such apparatus wherein turbulence is induced in the liquid or semi-liquids flow with a minimum of pressure drop through the flow conduit; and to provide a method and apparatus for mixing, blending or reacting liquid or liquefied materials for treating such materials in turbulent flow wherein the apparatus is economical to manufacture and efficient in operation for effective treatment with low power requirements.

Other objects and advantages of this invention will become apparent from the following description taken in connection with the accompanying drawings wherein are set forth by way of illustration and example certain embodiments of this invention.

FIG. 1 is a diagrammatic view of a system employing apparatus embodying the present invention for reacting and blending greases and the like.

Figure 1:
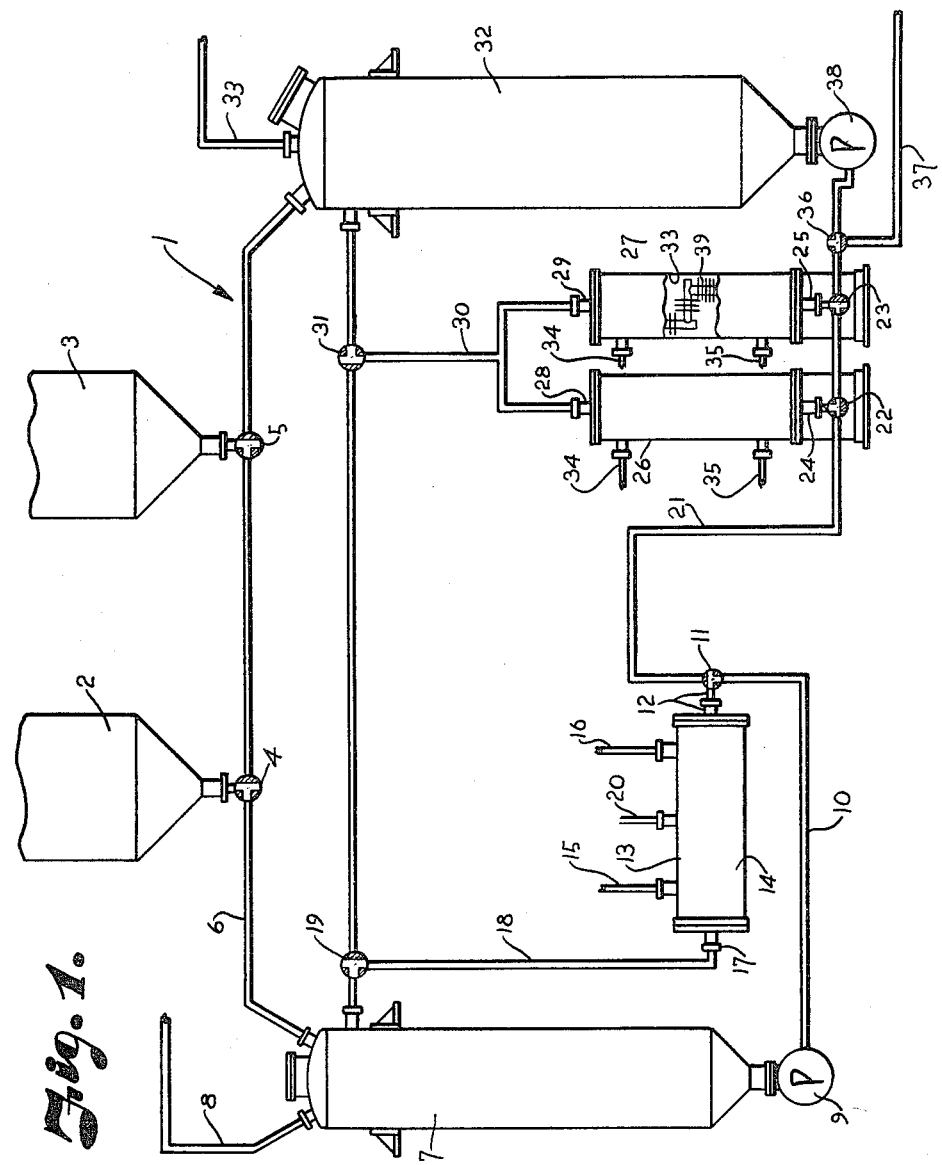

Referring more in detail to the drawings:

1 generally designates a processing apparatus having a plurality of containers 2 and 3 for materials to be processed wherein said materials are metered from the containers 2 and 3 through control of three-way valves 4 and 5 respectively through a flow line 6 to a primary mixing or combining tank 7. The tank 7 preferably has the materials introduced into the upper end thereof and also has a suitable vent 8 leading from the upper end. A pump 9 has its inlet connected to the lower end of the tank 7 for withdrawing materials therefrom and forcing same under pressure and at a desired velocity through a line 10 from which through a three-way valve 11 the flow is directed through a turbulent flow conduit 12 in a reactor 13 wherein the conduit is enclosed in a shell 14 in heat exchange relation with fluids or suitable heating media introduced into the shell 14 by a supply pipe 15 and ejected from the shell through a discharge pipe 16. The outlet end 17 of the conduit 12 communicates with a flow line 18 wherein the material being processed flows under control of a three-way valve 19 to the tank or vessel 7 for recycling. The reactor 13 includes a supply line 20 connected to a suitable source of supply of an additive or other material, said line 20 being connected to the conduit 12 whereby the added material is introduced into the other materials being processed at a selected stage of the mixing or reacting. After suitable recycling, the valve 11 is actuated whereby the discharge of the pump 9 is directed through a flow line 21 and, through three-way valves 22 and 23 which direct the flow into conduits 24 and 25 of blending devices 26 and 27 respectively with the outlets 28 and 29 communicating with a flow line 30 and, through a three-way valve 31, to a vessel 32 having a vent connection 33 and also connected to the line 6 whereby additional materials may be added to the materials being processed.

The blending vessels or devices 26 and 27 are arranged to provide parallel flow for the material being treated; however, a single blending device may be utilized with suitable flow characteristics and capacity. Each of the blending devices includes a shell 33 which surrounds the conduits 24 and 25 whereby said shells contain media in heat exchange relation to said conduits. The shells each have inlets 34 connected with a suitable source of supply of media, for example, cooling media, which is introduced therethrough into the shells and is ejected therefrom through discharge pipes 35. Said inlets and outlets 34 and 35 respectively are preferably adjacent opposite ends of the shells to assure flow of the cooling media through said shells in maximum flow contact with the conduits extending therethrough.

After the materials are removed from the tank 7, the valve 11 is actuated to return flow from the pump 9 to the conduit 12. The pump 9 is then stopped and additional material from the tanks 2 and 3 is introduced into the tank 7 for repeating the reaction stage of the process. The valves 22 and 23 are turned and a three-way valve 36 actuated to close a discharge pipe 37. Then a pump 38 having its inlet communicating with the lower end of the tank 32 is actuated to draw material from the tank 32 and force same under pressure past the valve 36 and through valves 23 and 22, conduits 24 and 25, line 30, valve 31, and back to the tank 32 to recycle the material being processed until blending and mixing is completed with the product having suitable consistency. Then the valve 36 is actuated to divert the discharge of pump 38 through the line 37 to a point of packaging or other use of the material processed, the pump 38 continuing operation until the processed material is removed from the tank 32. Then the pump 38 is stopped until another batch of reacted material is moved into the tank 32.

It is preferred that the reactor 13 and the blending devices 26 and 27 be of similar structure, and that the conduits therein have suitable heat exchange relation with the fluids in the respective shells and, for increased heat transmission, the conduits in the shell may have fins 39 suitably secured therealong in areas wherein maximum heat transmission is desired. Also the elongated shells of the reactor and blending devices may be arranged either vertically or horizontally. The shells and conduits therein are each of a structure exemplified by that illustrated in FIG. 2, and it is preferable that the shell be of such construction that the conduit be assembled therein whereby it can be readily removed. In the structure illustrated, the shell 33 forms an elongate cylinder having annular flanges 33' at the ends thereof to which heads 40 and 41 are secured to close the opposite ends and define a chamber 42 therein. The conduit 12 has an inlet portion 43 which extends through an opening 44 in the head 40 and terminates in an inlet end 45 exteriorly of the shell. The shell head 40 has a suitable packing 46 and packing gland 47 arranged to compress the packing and seal the joint in the passage or opening 44 around the inlet portion 43 of the conduit. The conduit has an outlet portion 48 that extends through a passage or opening 49 in the head 41 and terminates in an outlet end 50 exteriorly of the shell. The head 41 has a packing 51 and packing gland 52 operable to compress the packing 51 into sealing relation with the outlet portion 48 in the passage 49 whereby the joints through which the inlet and outlet portions of the conduit extend are fluid-tight.

Figure 2:
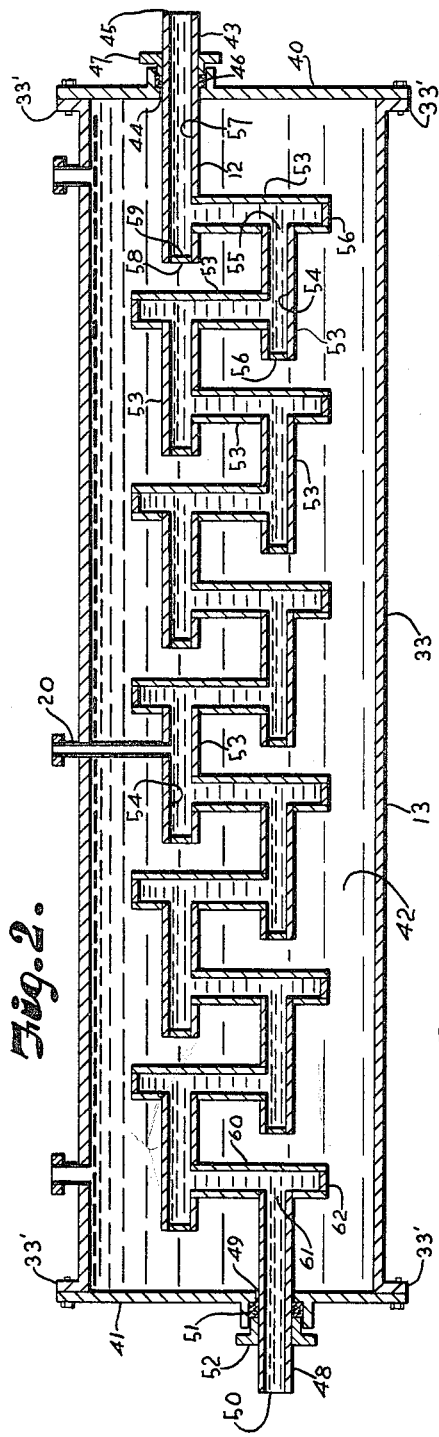
FIG. 2 is an enlarged semi-diagrammatic longitudinal sectional view through the treating apparatus as a reactor.

The conduit 12 has a plurality of elongate tubular members 53 defining elongate flow zones connected in communicating relation in a series from the inlet portion 43 to the outlet portion 48. The tubular members 53 each have bores 54 forming confined flow paths which are substantially unobstructed for the respective lengths thereof with an inlet 55 at one end and having a closed end 56 at the other end. The tubular members 53 are arranged in a series with the inlet ends 55 connected in communicating relation to the next preceding tubular member intermediate the ends thereof and preferably spaced from the respective closed end 56 of said next preceding tubular member in the series a distance greater than the transverse dimension of the bore of the respective tubular member. In the illustrated structure, the inlet portion 43 has a bore 57 and the end thereof is closed by a suitable plug 58 having a face 59 substantially normal to the direction of flow of fluids in the bore 57. A first tubular member 53 has its inlet end communicating with the bore 57 at substantially right angles thereto in spaced relation to the face 59 of the plug 58 a distance greater than the transverse dimension of the bore 57 with said first tubular member 53 extending therefrom and having a closed end 56 closed by a plug 58 spaced from the inlet portion 43 with a second tubular member 53 communicating with the bore of the first tubular member in spaced relation to the respective closed end thereof as illustrated in FIG. 2. This arrangement of the series of tubular members is repeated with the last tubular member 60 of the series having communication with an inlet 61 of the outlet portion 48 in spaced relation to the closed end 62 of said last tubular member and at substantially right angular relation thereto.

A fluid such as a liquid or liquids, or semi-liquid, introduced under pressure at suitable velocity into the inlet portion 43 has uni-directional flow in the portion thereof upstream from the inlet to the first tubular member 53. However, said flow is directed against the plug 58 reversing the flow whereby in the portion between the plug 58 and the inlet to the first tubular member 53 the flow is counter-current flow. The materials from the bore 57 flow into the bore of the first tubular member 53 in generally uni-directional flow in the portion thereof between the inlet of said first tubular member to the inlet of the second tubular member, the flow being countercurrent in the portion of the first tubular member between the inlet of the second tubular member and the plug or closed end 56 of the first tubular member in the same manner as described relative to the flow in the bore 57. This same flow characteristic is repeated in the flow zones or paths throughout the series of the tubular members 53. The materials introduced into the inlet portion 43 are preferably at a velocity and viscosity relative to the bore 57 that the uni-directional flow therein may be what is characterized as non-turbulent flow.

It is customary to consider that the nature of flow of fluids in pipe, i.e. whether it is viscous or turbulent, depends upon the pipe diameter, the density and viscosity of the flowing fluid and the velocity of the flow, and the numerical value of a dimensionless combination of these four variables known as Reynolds number serves to indicate whether the flow is viscous or turbulent. The flow is viscous for Reynolds numbers less than 1200 and turbulent for Reynolds numbers greater than 2200. Between these two values lies a transition region in which the flow may be either viscous or turbulent depending upon the condition of the flow as it enters the pipe section and to a certain extent upon the roughness of the pipe wall. With the arrangement of the tubular members 53 to provide a plurality of communicating flow zones in a series, as illustrated in FIG. 2, and with the pipe walls smooth, it is found that the flow of the materials is turbulent in the first tubular members 53 and throughout each of the tubular members in the series, both in the uni-directional flow portion and the counter-current flow portion in a structure wherein the uni-directional flow portion of each of the bores of the tubular members 53 are of a length that is less than 90 times the diameter or transverse dimension of the respective bores. The erratic flow pattern through the flow zones provides turbulent flow when the conduit flow zones or treatment zones are of conditions of bore size and liquid flow quantities and viscosity that the flow in a straight pipe would give a Reynolds number substantially below 1200, which is in the range normally considered as providing viscous flow.

It is preferred that the bores in the tubular members 53 be of uniform size throughout their length and the same size as the bores 57 and 61 in the inlet portion 43 and outlet portion 48 whereby there is unrestricted flow and a minimum of pressure drop through the conduit thereby requiring a minimum of power for the operation of the pumps which provides all of the energy for the mixing action and turbulence in the conduit, there being no moving parts in the reactor or blending devices. However, the bores 54 in the tubular members 53 may be restricted upstream from the inlet of the next succeeding tubular member to form a restricted flow opening and increase velocity of the fluids that impinge against the faces 59 of the plugs at the closed ends of the tubular members. In instances where additional materials are to be added to the materials being mixed in the series of turbulent zones, the line 20 leading from a source of supply of the additional material communicates with a bore 54 of a tubular member 53 in the length thereof between the inlet end thereof and the inlet of the next succeeding tubular member. Such added material may be added or introduced into the materials in the conduit at any stage of the turbulent mixing or reacting by connecting the line 20 to a selected tubular member.

The tubular members of the conduit 12 may be arranged as desired providing the direction of flow is always toward the closed end of the respective tubular member, and the inlet of the next succeeding tubular member is spaced upstream from the closed end of the tubular member.

Figure 3:
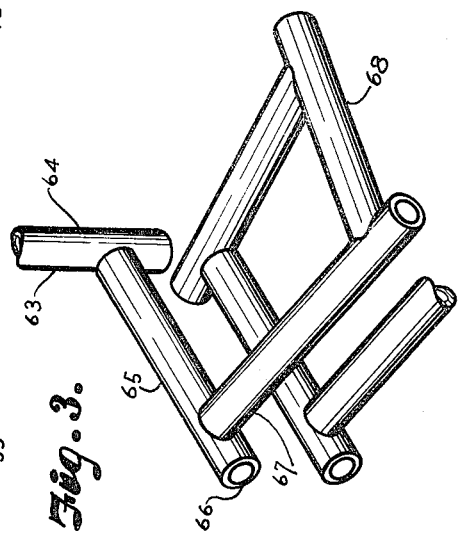
FIG. 3 is an enlarged fragmentary perspective view of the turbulent flow conduit arranged in a form of coil.

In the form of the invention illustrated in FIG. 3, the conduit 63 is arranged generally in a spiral with an inlet portion 64 arranged substantially vertically and the tubular member 65 extending laterally therefrom substantially at right angles to the direction of flow in the inlet portion 64 and spaced from the closed end 66 thereof. The second tubular member 67 communicates with and extends from the first tubular member 65 at right angles to the direction of flow in the tubular member 65 with the tubular member 67 inclined downwardly therefrom. The third tubular member 68 in the series and the remaining tubular members in sequence in the series extend at right angles to the direction of flow of the next preceding tubular member and are inclined downwardly as illustrated in FIG. 3 to form the modified spiral. Other arrangements may be utilized to conserve space or to arrange the conduits in suitable shells, providing the relative arrangement of the tubular members defining the series of communicating flow zones is retained.

Figure 4:
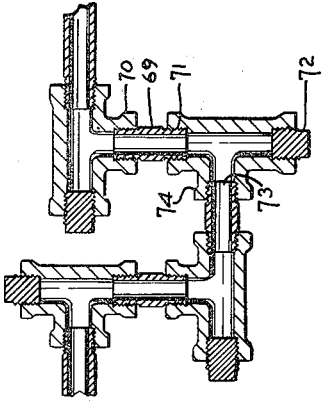
FIG. 4 is a semi-diagrammatic longitudinal sectional view through a modified form of turbulent flow conduit formed of pipe and pipe fittings.

In the form of the invention illustrated in FIG. 4, the conduit is formed of conventional pipe and pipe fittings which are illustrated as of threaded type wherein the tubular members are lengths of pipe 69 threaded at each end and screwed into branches of T's 70. The flow pipes 69 have their downstream ends 71 threaded into one of the aligned branches of a T and a plug 72 is threaded into and closes the other of said aligned branches, the flow pipes having their inlet ends 73 threaded into the branches 74 of the T's that extend at right angles to the aligned branches.

Other forms of piping and fittings may be utilized to provide the flow paths in their communicating relation to provide uni-directional flow in the upstream portion of each flow zone and counter-current flow in the downstream portion thereof, with the inlet of one flow zone communicating with the next preceding flow zone substantially at the point of transition from uni-directional to counter-current flow. The arrangement of the conduit with the tubular members and flow zones provides a rapid mixing and turbulent action with more uniform heat absorption or dissipation that is particularly efficient in mixing, blending and reacting liquids, semi-liquids, liquids and solids, for use in acid treating of hydrocarbon in the manufacture of soap, greases and other liquids and semi-liquids to form an improved product with better economy.

It is to be understood that while I have illustrated and described one form of my invention, it is not to be limited to the specific form or arrangement of parts herein described and shown except insofar as such limitations are included in the claims.

What I claim and desire to secure by Letters Patent is:

1. Apparatus for inducing turbulent flow of fluids comprising, a tubular flow conduit having an inlet and an outlet, said conduit having a plurality of connected elongate tubular members arranged in a series downstream one to another with each defining a confined flow path substantially corresponding in length and cross-sectional area to that of the others, means in said tubular members obstructing the flow whereby fluids flowing toward said obstructing means impinge thereon and reverse in flow direction, said tubular members each having an inlet communicating with the respective next preceding tubular member intermediate the length thereof and spaced upstream from said obstructing means, said spacing in said tubular members being substantially equal one to the others, and means connected to said inlet of said conduit and delivering said fluid thereto under pressure and of a quantity to normally effect a non-turbulent flow through a tubular member corresponding in cross-sectional area to said tubular members, said apparatus being characterized by the counter-current flow in the tubular members between the respective obstructing means and the inlet to the next succeeding tubular member effecting a turbulent flow of said fluid into said next succeeding tubular member.

2. Apparatus for inducing turbulent flow of fluids comprising, a tubular flow conduit having an inlet and an outlet for flow generally in a direction from said inlet to said outlet, said conduit having a series of connected elongate tubular members arranged downstream one to another with each defining a confined flow path substantially corresponding in length and cross-sectional area to the others, means in said tubular members obstructing the flow whereby fluids flowing toward said obstructing means impinges thereon and reverse in flow direction, said tubular members each having an inlet communicating with the next preceding tubular member in the series intermediate the length thereof and spaced upstream from said obstructing means whereby flow in each tubular member is uni-directional in the portion upstream from the inlet of the next succeeding tubular member and countercurrent in the portion between the obstructing means and said inlet of the next succeeding tubular member, each tubular member having its major length in the portion from the inlet thereof to the inlet of the next succeeding tubular member, and means connected to said inlet of said conduit and delivering said fluid thereto under pressure and of a quantity to normally effect a non-turbulent flow through a tubular member corresponding in cross-sectional area to said tubular members, said apparatus being characterized by the counter-current flow in the tubular members between the respective obstructing means and the inlet of the next succeeding tubular member effecting a turbulent flow of fluid through the uni-directional flow portion of said next succeeding tubular member.

3. Apparatus for inducing turbulent flow of fluids comprising, a tubular flow conduit having an inlet and an outlet for flow generally in a direction from said inlet to said outlet, said conduit having a series of connected elongate tubular members arranged downstream one to another and each defining a confined flow path substantially corresponding in length to that of the others, said tubular members each having a closed end downstream of the direction of flow of fluids therein, said tubular members each having an inlet communicating with the next preceding tubular member in the series intermediate the length thereof and spaced upstream from said closed end of said next preceding tubular member whereby flow in each tubular member is uni-directional in the portion thereof upstream from the inlet of the next succeeding tubular member and in the portion between the closed end thereof and the inlet of the next succeeding tubular member the flow toward the closed end impinges thereon and reverses providing a counter-current flow, said spacing between the closed end of the tubular member and the inlet to the next succeeding tubular member being in the nature of and not less than the transverse dimension of the confined flow path adjacent said closed end of the respective tubular member, and means connected to said inlet of said conduit and delivering fluid thereto under pressure and of quantity to normally effect a non-turbulent flow through a tubular member corresponding in cross-sectional area to said tubular members, said apparatus being characterized by the counter-current flow in the tubular members between the respective closed end thereof and the inlet to the next succeeding tubular member effecting a turbulent flow of said fluids in the uni-directional portion of the next succeeding tubular member.

4. Apparatus for continuous flow mixing of fluids comprising, a common conduit for combined flow of a plurality of fluids to be mixed and having an inlet end and an outlet end for flow generally in a direction toward said outlet end, said conduit having a series of elongate flow zones of substantially uniform cross-sectional area with each terminating in a closed end downstream of said direction of flow, said flow zones each having an inlet end communicating with the next preceding flow zone of the series at substantially right angular relation to the direction of flow therein and in spaced relation to the respective closed end thereof, said spacing between the point of communication of said respective flow zone inlets and the closed end of the next preceding flow zone being in the nature of and not less than the transverse dimensions of said flow zones whereby the flow in the respective flow zones is uni-directional in the portion upstream from the point of communication with the next succeeding flow zone and is counter-current in the portion between said point of communication and the closed end of the respective flow zone, said upstream portion being the major length of the respective flow zone, and means connected to said inlet end of said common conduit and delivering said plurality of fluids thereto under pressure and of a quantity to normally effect a non-turbulent flow through a flow zone corresponding in cross-sectional area to said conduit flow zones, said apparatus being characterized by the counter-current flow in the flow zones between the respective closed end and the inlet ends of the next succeeding flow zone effecting turbulent flow of said fluids in said next succeeding flow zone.

5. Apparatus for flow mixing and reacting of fluids comprising, an elongate shell refining a chamber therein, a conduit for flow of fluid therethrough positioned in said chamber, an inlet exteriorly of the shell and communicating with one end of the conduit for introducing fluid under pressure for flow therethrough, an outlet exteriorly of the shell and communicating with the other end of the conduit for discharge of fluid therefrom, said conduit having a series of spaced elongate substantially uniform flow zones terminating in closed ends downstream of said direction of flow, said flow zones each having an inlet end communicating with the next preceding flow zone of the series in spaced relation to the respective closed end thereof, said spacing in each flow zone between the closed end thereof and the point of communication with the next succeeding flow zone being in the nature of and not less than the transverse dimensions thereof, said flow in the flow zones being uni-directional in the portion thereof upstream from the point of communication with the next succeeding flow zone and counter-current between said point of communication and the closed end of the respective flow zone, an inlet to the shell chamber for introducing fluid therein in heat exchange relation to said conduit, an outlet from the shell chamber remote from said chamber inlet for ejecting fluid therefrom, and means connected to said conduit inlet and delivering fluids thereto under pressure and of a quantity to normally effect a non-turbulent flow through a flow zone corresponding in cross-sectional area to said conduit flow zones, said conduit being characterized by said counter-current flow effecting a turbulent flow that continues through the next succeeding flow zone.

6. Apparatus for flow mixing and reacting of fluids comprising, an elongate shell defining a chamber therein, a common conduit for combined flow of a plurality of fluids therethrough positioned in said chamber, an inlet exteriorly of the shell and communicating with one end of the conduit for introducing fluid under pressure for flow therethrough, an outlet exteriorly of the shell and communicating with the other end of the conduit for discharge of fluids therefrom, said conduit having a plurality of elongate tubular members of substantially uniform length and cross-sectional area connected in a series and each defining a confined unobstructed flow path, said tubular members having closed downstream ends with faces of said ends inside of the respective tubular members substantially normal to the direction of flow therein, said tubular members each having an inlet communicating with the next preceding tubular member in spaced relation upstream from the respective closed end of said next preceding tubular member whereby fluid flow in said tubular members upstream from the inlet to the next succeeding tubular member inlet is uni-directional and said fluid flow toward said closed end face impinges thereon and reverses direction for counter-current flow from said closed end face to the inlet of the next succeeding tubular member, said spacing in each tubular member between the closed end face and the inlet of the next succeeding tubular member being in the nature of and not less than the transverse dimensions of said tubular members, an inlet to the shell chamber for introducing fluid therein in heat exchange relation to said conduit, an outlet from the shell chamber remote from said chamber inlet for ejecting fluid therefrom, and means connected to said conduit inlet and delivering fluids thereto under pressure and of a quantity to normally effect a non-turbulent flow through a flow zone corresponding in cross-sectional area to said conduit flow zones, said conduit being characterized by said counter-current flow effecting a turbulent flow that continues through the next succeeding flow zone.

7. Apparatus for flow mixing and reacting of fluids comprising, an elongate shell defining a chamber therein, a common conduit for combined flow of a plurality of fluids therethrough positioned in said chamber, an inlet exteriorly of the shell and communicating with one end of the conduit for introducing fluid under pressure for flow therethrough, an outlet exteriorly of the shell and communicating with the other end of the conduit for discharge of fluids therefrom, said conduit having a plurality of elongate tubular members of substantially uniform length and cross-sectional area connected in a series and each defining a confined unobstructed flow path, said tubular members having closed downstream ends with faces of said ends inside of the respective tubular members substantially normal to the direction of flow therein, said tubular members each having an inlet communicating with the next preceding tubular member in spaced relation upstream from the respective closed end of said next preceding tubular member whereby fluid flow in said tubular members upstream from the inlet to the next succeeding tubular member inlet is unidirectional and said fluid flow toward said closed end face impinges thereon and reverses direction for counter-current flow from said closed end face to said inlet of the next succeeding tubular member, said spacing in each of said tubular members between the closed end face and the inlet of the next succeeding tubular member being in the nature of and not less than the transverse dimensions of said tubular members, a second conduit communicating with a tubular member intermediate the ends of the first-named conduit for introducing additional fluids under pressure for combined flow through the succeeding tubular members with said first-named fluids for reaction therewith, an inlet to the shell chamber for introducing fluid therein in heat exchange relation to said conduit, an outlet from the shell chamber remote from said chamber inlet for ejecting fluid therefrom, and means connected to said conduit inlet and delivering fluids thereto under pressure and of a quantity to normally effect a non-turbulent flow through a flow zone corresponding in cross-sectional area to said conduit flow zones, said conduit being characterized by said counter-current flow effecting a turbulent flow that continues through the next succeeding flow zone.

References Cited in the file of this patent

UNITED STATES PATENTS

| | | |
|---|---|---|
| 85,920 | Foot | Jan. 19, 1869 |
| 1,799,626 | Keith | Apr. 7, 1931 |
| 1,907,455 | Stenzel | May 9, 1933 |
| 2,478,917 | Hain | Aug. 16, 1942 |
| 2,426,669 | Cary | Sept. 2, 1947 |
| 2,498,405 | Fader | Feb. 21, 1950 |
| 2,894,732 | Taber | July 14, 1959 |

FOREIGN PATENTS

| | | |
|---|---|---|
| 314,124 | Germany | Sept. 1, 1919 |
| 353,448 | Germany | May 19, 1922 |